United States Patent
Cunningham et al.

(10) Patent No.: US 11,447,989 B2
(45) Date of Patent: Sep. 20, 2022

(54) HOOD PROP ROD ASSEMBLY FOR VEHICLES

(71) Applicant: TOYOTA MOTOR ENGINEERING & MANUFACTURING NORTH AMERICA, INC., Plano, TX (US)

(72) Inventors: James D. Cunningham, Clarkston, MI (US); Scott L. Frederick, Brighton, MI (US); Paxton S. Williams, Milan, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 455 days.

(21) Appl. No.: 16/674,426

(22) Filed: Nov. 5, 2019

(65) Prior Publication Data

US 2021/0131154 A1 May 6, 2021

(51) Int. Cl.
*E05C 17/16* (2006.01)
*E05C 17/12* (2006.01)
*E05C 17/08* (2006.01)
*B62D 25/12* (2006.01)

(52) U.S. Cl.
CPC .............. *E05C 17/16* (2013.01); *B62D 25/12* (2013.01); *E05C 17/08* (2013.01); *E05C 17/12* (2013.01)

(58) Field of Classification Search
CPC .......... E05C 17/16; E05C 17/08; E05C 17/12; E05C 17/14; B60R 21/38; B62D 25/12; E05Y 2900/536; Y10T 292/65; Y10S 292/14
See application file for complete search history.

(56) References Cited

U.S. PATENT DOCUMENTS

| 4,586,579 | A | * | 5/1986 | Matsui | ..................... E05C 17/14 180/69.21 |
| 4,588,220 | A | * | 5/1986 | Matsui | ..................... E05C 17/14 292/262 |
| 4,920,592 | A | * | 5/1990 | Scott | ....................... E05C 17/04 7/138 |

(Continued)

FOREIGN PATENT DOCUMENTS

CN 206218024 U 6/2017
DE 102014105497 A1 * 10/2014 ............. E05C 17/04

(Continued)

*Primary Examiner* — Justin B Rephann
(74) *Attorney, Agent, or Firm* — Dinsmore & Shohl LLP

(57) ABSTRACT

Embodiments herein are directed to a hood prop assembly for a vehicle having a hood panel with a slot. The hood prop assembly includes an elongated member, a housing, and a retainer mechanism. The elongated member has a first end and a second end. The first end is coupled to the vehicle. The housing includes a cavity. The housing further includes a distal end and a proximate end. The cavity extends axially from the proximate end and receives the second end of the elongated member. The retainer mechanism extends from the distal end of the housing. The housing and the retainer mechanism rotatably move with respect to the second end of the elongated member between a locked position and an unlocked position. In the locked position, the retainer mechanism engages with the slot to retain the hood panel and in the unlocked position, the retainer mechanism disengages with the slot.

12 Claims, 3 Drawing Sheets

(56) References Cited

U.S. PATENT DOCUMENTS

| | | | | |
|---|---|---|---|---|
| 5,306,053 A * | 4/1994 | Gurusami | ............... | E05B 83/16 |
| | | | | 292/338 |
| 6,244,650 B1 * | 6/2001 | Namvari | ................. | E05C 17/14 |
| | | | | 296/76 |
| 6,609,583 B2 * | 8/2003 | Schillaci | ................ | B62D 25/12 |
| | | | | 180/69.21 |
| 7,802,345 B2 * | 9/2010 | Mathew | ................. | E05D 15/46 |
| | | | | 296/193.11 |
| 10,508,484 B1 * | 12/2019 | Zhao | ........................ | E05F 5/00 |
| 2002/0000022 A1 * | 1/2002 | Schillaci | ................ | E05C 17/22 |
| | | | | 16/319 |
| 2007/0194199 A1 * | 8/2007 | Kurtz | ................... | E05C 17/042 |
| | | | | 248/352 |
| 2009/0048734 A1 * | 2/2009 | Iwai | ........................ | B60R 21/38 |
| | | | | 701/36 |
| 2009/0152900 A1 * | 6/2009 | Kyung | ................... | B62D 25/12 |
| | | | | 296/193.11 |
| 2016/0339963 A1 * | 11/2016 | Inoue | ..................... | B60R 21/38 |
| 2018/0238089 A1 * | 8/2018 | Duvall | ................. | E05C 17/12 |
| 2019/0017310 A1 * | 1/2019 | Kolar | ..................... | E05F 5/022 |
| 2021/0371015 A1 * | 12/2021 | Okamura | ............... | B62D 25/12 |
| 2021/0388650 A1 * | 12/2021 | Liao | ........................ | E05C 17/30 |

FOREIGN PATENT DOCUMENTS

| | | | | |
|---|---|---|---|---|
| FR | 2478176 A1 | 9/1981 | | |
| KR | 100368399 B1 | 1/2003 | | |
| KR | 100644484 B1 | 4/2005 | | |
| KR | 2005122490 A * | 12/2005 | ............ | B60R 21/38 |
| KR | 2006023348 A * | 3/2006 | ............ | B62D 25/12 |
| KR | 20060042736 A | 5/2006 | | |
| KR | 2007021492 A * | 2/2007 | ............ | B62D 25/12 |
| KR | 100764506 B1 | 10/2007 | | |
| KR | 101125003 B1 | 3/2012 | | |

* cited by examiner

HOOD PROP ROD ASSEMBLY FOR VEHICLES

TECHNICAL FIELD

The present disclosure generally relates to hood prop rods and, more specifically, to hood prop rods that have a rotating assembly that locks the prop rod into a hood.

BACKGROUND

Some vehicles are equipped with a hood prop rod that has a first end pivotally attached to a body panel of an engine compartment and a second end that engages with an aperture or a slot within a hood inner panel of an engine compartment hood when the engine compartment hood is opened for the purposes of accessing the engine compartment of a vehicle. The hood prop rod holds or props the engine compartment hood in a raised or open position permitting access to the engine compartment. Often, the second end is an injection molded end piece or a hook that engages with the aperture or slot of the hood inner panel. The injection molded end piece or hook generally relies on gravity to hold or secure the hood to the prop rod. Many times, when the hood is propped in the raised position, the hood may inadvertently become disengaged from the end piece or hook, causing the hood to fall down into a lowered position.

Accordingly, there is a need for prop rod assemblies that can lock into the aperture or slot of the hood inner panel to prevent an inadvertent disengagement of the hood from the prop rod.

SUMMARY

In one aspect, a hood prop assembly for a vehicle having a hood panel with a slot is provided. The hood prop assembly includes an elongated member, a housing, and a retainer mechanism. The elongated member has a first end and a second end. The first end is coupled to the vehicle. The housing includes a cavity. The housing further includes a distal end and a proximate end. The cavity extends axially from the proximate end and receives the second end of the elongated member. The retainer mechanism extends from the distal end of the housing. The housing and the retainer mechanism rotatably move with respect to the second end of the elongated member between a locked position and an unlocked position. In the locked position, the retainer mechanism engages with the slot to retain the hood panel and in the unlocked position, the retainer mechanism disengages with the slot.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present disclosure include a hood panel having an inner panel with an aperture or slot disposed therein. A hood prop assembly is provided. The hood prop assembly includes an elongated member and an attachment member. The elongated member has a first end and a second end. The first end is pivotally coupled to the vehicle. The attachment member includes housing that has an exterior surface, a cavity, and a retainer mechanism. The housing includes a distal end and a proximate end. The cavity extends axially from the proximate end. The cavity receives the second end of the elongated member in a snap fit configuration. The retainer mechanism extends from the distal end of the housing in a direction opposite of the proximate end. The retainer mechanism moves with respect to the housing between a locked position and an unlocked position to retain the hood panel.

The retainer mechanism includes a T-shaped portion and a biasing member. The T-shaped portion may be inserted into the slot or aperture of the hood panel when the T-shaped portion is in the unlocked position and retains the hood panel in the locked position. The biasing member is positioned within the cavity and between the distal and proximal ends of the housing and rotatably biases the housing and the retainer mechanism with respect to the second end of the elongated member between the locked position and the unlocked position. Further, a pair of flanges extend outwardly from the distal end of the housing that provide a fixture for a user to generate a rotational force necessary to rotate the housing and the retainer mechanism.

Figure 1:
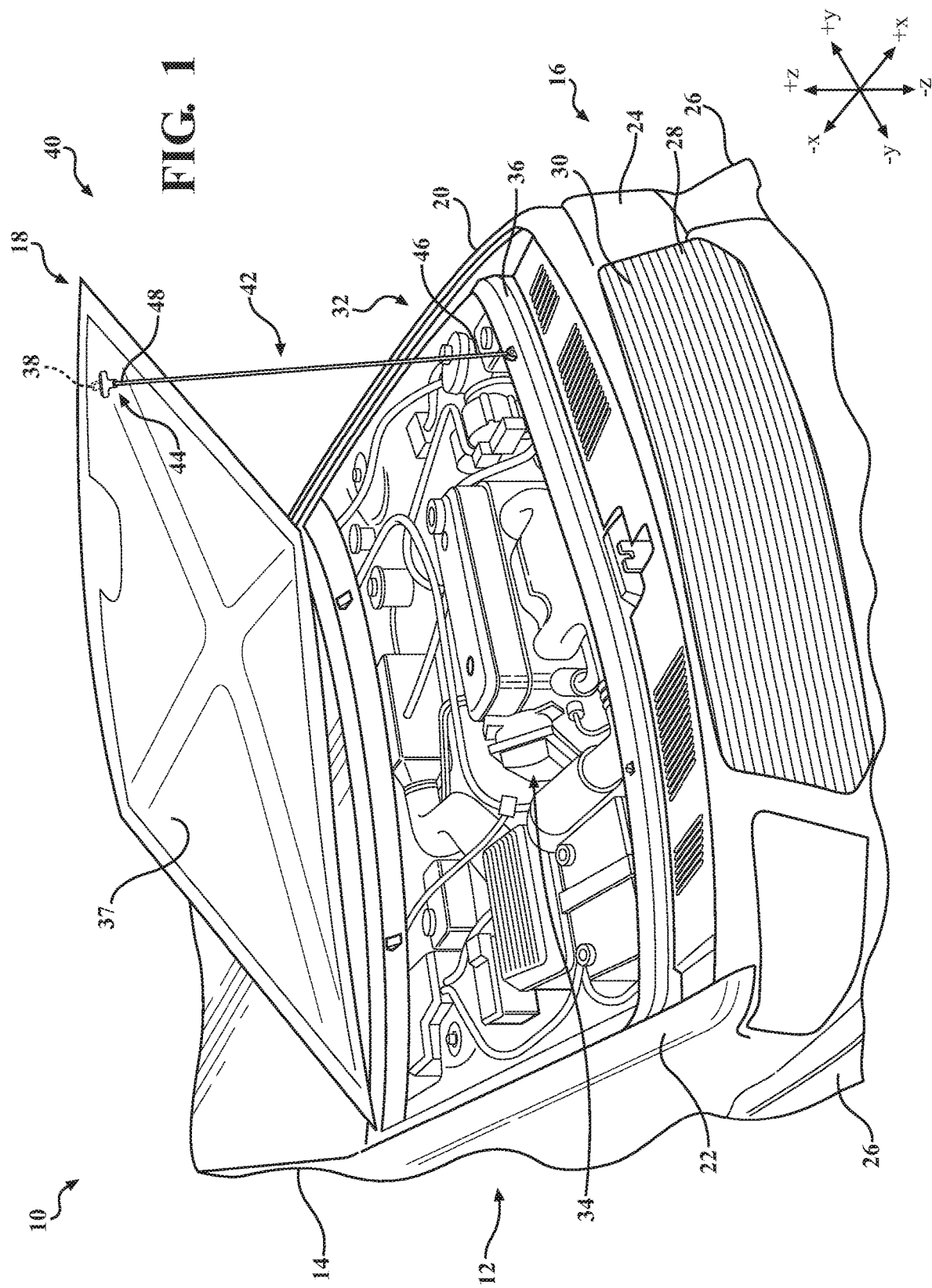
FIG. 1 schematically depicts a perspective view of a vehicle engine compartment with a hood panel held in a raised position by a hood prop assembly according to one or more embodiments shown or described herein.
Figure 2:
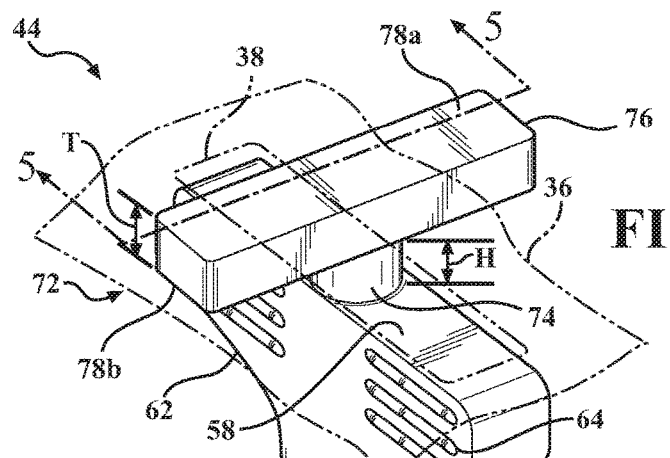
FIG. 2 schematically depicts an exploded view of the hood prop assembly of FIG. 1 in a locked position according to one or more embodiments shown or described herein.

Referring to FIG. 1, as used herein, the term "vehicle longitudinal direction" refers to the forward-rearward direction of the vehicle (i.e., in the +/- vehicle X direction depicted in FIG. 1). The term "vehicle lateral direction" refers to the cross-vehicle direction (i.e., in the +/- vehicle Y direction depicted in FIG. 1), and is transverse to the vehicle longitudinal direction. The term "vehicle vertical direction" refers to the upward-downward direction of the vehicle (i.e., in the +/- vehicle Z direction depicted in FIG. 1).

Still referring to FIG. 1, a perspective view of an example vehicle 10 is schematically depicted. The example vehicle 10 may include a vehicle body 12 onto which a vehicle drivetrain is coupled. The example vehicle 10 may also include a passenger compartment 14 that is integral with the vehicle body 12. The example vehicle 10 may include a front end assembly 16 that includes a hood 18, front fenders 20 and 22, and an upper grille assembly 24 and a front bumper assembly 26 extending between the front fenders 20 and 22. Generally, the upper grille assembly 24 may include a covering portion 28 with a number of grille deflectors 30, a mesh or other suitable covering that protects a radiator supported by a radiator support assembly behind the covering portion 28, while allowing air to flow past the covering and over the radiator.

An engine compartment 32 may be positioned between the front fenders 20, 22 and behind the upper grille assembly 24 and front bumper assembly 26 and below the hood 18. The engine compartment 32 houses an engine 34 and other powertrain components. Further, the engine compartment 32 may include a body component 36. The hood 18 includes an inner panel 37. The inner panel 37 further includes a slot 38, an aperture, and the like. The hood 18 is movable between a closed and a raised position, illustrated in FIG. 1. When the hood 18 is in the raised position, access is permitted into the engine compartment 32. The example vehicle 10 further includes a hood prop assembly 40. The hood prop assembly 40 maintains the positon of the hood 18 in the raised position.

It should be appreciated that the example vehicle 10 described herein may be an automobile, a truck, a sports utility vehicle or the like. Further, the example vehicle 10 described herein may include an internal combustion engine and the associated powertrain components, a diesel engine and the associated powertrain components, may be semi-autonomous, fully autonomous, a hybrid vehicle and the like.

Referring now to FIGS. 2-5 and still to FIG. 1, the hood prop assembly 40 includes an elongated member 42 and an attachment member 44. The elongated member 42 has a first end 46 and a second end 48. The first end 46 is pivotally coupled to the body component 36 such that the elongated member 42 may be moved between a closed position (e.g., clasped onto the body component 36) and a raised position, as illustrated in FIG. 1.

It should be appreciated that the first end 46 pivotally coupled to the body component 36 is not limited to the body component 36 as illustrated in FIG. 1 and may be provided at any suitable position within the engine compartment 32, such as on an opposite side of the body component 36, along one of the front fenders 20, 22, and the like. The second end 48 is coupled to the attachment member 44, as discussed in greater detail herein. Further, the second end 48 of the elongated member 42 includes a notch 66 receives a portion of a biasing member 68, as discussed in greater detail herein.

The attachment member 44 includes a housing 50 and a retainer mechanism 52. The housing 50 includes an exterior surface 54a, an opposite interior surface 54b defined by a cavity 56 that extends axially in the system vertical direction (i.e., in the +/−Z direction). The housing 50 includes a distal end 58 and a proximate end 60. It should be appreciated that the cavity 56 extends axially from the proximate end 60 of the housing 50 and terminates before the distal end 58 of the housing 50. As such, the cavity 56 has an opening 57a at the proximate end 60 of the housing 50 and an end wall 57b near the distal end 58 of the housing 50. That is, the end wall 57b terminates the cavity 56 prior to the distal end 58 of the housing 50 such that the cavity 56 does not axially extend through the housing 50. The cavity 56 further includes a receiving channel 70 that extends beyond the end wall 57b in the system vertical direction (i.e., in the +/−Z direction). The receiving channel 70 receives a portion of the biasing member 68, as discussed in greater detail herein.

The cavity 56 may receive the second end 48 of the elongated member 42. In some embodiments, the second end 48 is retained in the cavity 56 by a snap fit engagement. In other embodiments, the second end 48 is retained in the cavity 56 by a fastener such as a set screw, a bolt and nut, rivet, and the like, by a c-clamp, by a pair of tabs that extend from the second end 48 and protrude into complimentary recesses within the cavity 56, and the like.

The housing 50 further includes a pair of flanges 62. Each of the pair of flanges 62 extend outwardly from the exterior surface 54a of the housing 50 near or adjacent to the distal end 58. That is, the pair of flanges 62 extend from the exterior surface 54a closer to the distal end 58 than the proximate end 60. It should be understood that this is non-limiting and that the pair of flanges 62 may extend from the exterior surface 54a anywhere between the distal end 58 and the proximate end 60. The pair of flanges 62 may provide a fixture for a user to generate a rotational force necessary to rotate the housing 50 and the retainer mechanism 52. As such, each one of the pair of flanges 62 may include a contact surface 64 configured for the user to make contact with the pair of flanges 62. In some embodiments, the contact surface 64 is a friction surface, such as rubber, an anti-slip surface, and the like. As such, it should be appreciated that the pair of flanges 62 may be finger pads that are used to move, or rotate the housing 50 and the retainer mechanism 52 from the locked position (FIGS. 2 and 5) to the unlocked position (FIGS. 3 and 4), as discussed in greater detail herein.

In some embodiments, the housing 50 may be a plastic material such as a polymer, a polyetheretherketone (PEEK), and the like. In other embodiments, the housing 50 may be materials suitable for injection molding such as Acrylonitrile Butadiene Styrene, Polyethylene, Polyamide (Nylon), High Impact Polystyrene, Polypropylene, and the like. In other embodiments, the housing 50 may be a steel, a composite metal, and the like.

Still referring to FIGS. 1-5, the retainer mechanism 52 of the attachment member 44 includes a T-shaped portion 72 and the biasing member 68. The T-shaped portion 72 extends from the distal end 58 of the housing 50 in a direction opposite of the proximate end 60 of the housing 50. The T-shaped portion 72 has a base 74 and an arm 76. The arm 76 includes an outer surface 78a and an opposite interior surface 78b to define a thickness T. The interior surface 78b is nearest to distal end 58 of the housing 50. The base 74 extends from the distal end 58 of the housing 50. In some embodiments, the base 74 is a tubular shape. In other embodiments, the base 74 may have other shapes such as square, rectangular, elliptical, and the like.

The base 74 has a height H. It should be appreciated that the height H of the base 74 is the distance necessary between the distal end 58 of the housing 50 and the interior surface 78b of the arm 76. That is, the height H is a gap that should be larger than the thickness of the inner panel 37 of the hood 18 such that when the arm 76 of the T-shaped portion 72 is positioned within the slot 38, the T-shaped portion 72 may move or rotate, as discussed in greater detail herein. Further, it should be appreciated that the thickness T of the arm 76 is a predetermined thickness less than the distance is the slot 38 between the inner panel 37 and the hood 18 such that the T-shaped portion 72 may move or rotate while the arm 76 is between the inner panel 37 and the hood 18, as discussed in greater detail herein.

The biasing member 68 is positioned within the cavity 56 between the distal end 58 and the proximate end 60 of the housing 50. In some embodiments, the biasing member 68 is a helical torsion spring. In other embodiments, the biasing member 68 may be a coil spring, a resilient member such as rubber, and the like. The biasing member 68 may include a distal leg 80 and a proximate leg 82. In some embodiments, the distal leg 80 may extend axially or perpendicular to a coil of the biasing member 68 in the system vertical direction (i.e., in the +/−Z direction). In other embodiments, the distal leg 80 may extend parallel or in the system lateral direction (i.e., in the +/−Y direction). It should be appreciated that the distal leg 80 may also extend in the system longitudinal direction (i.e., in the +/−X direction) may be angled, or may extend in a combination of the system directions.

The notch 66 of the elongated member 42 receives a portion of the proximate leg 82 of the biasing member 68. Further, the receiving channel 70 of the cavity 56 receives a portion of the distal leg 80 of the biasing member 68. In some embodiments, the receiving channel 70 extends into the base 74. As such, a portion of the distal leg 80 of the biasing member 68 is also positioned within the base 74 of the T-shaped portion 72. As such, the second end 48 of the elongated member 42 may be snap fitted into the cavity 56 such that the biasing member 68 circumferentially surrounds the second end 48 of the elongated member 42 when the elongated member 42 is seated within the cavity 56. That is, the biasing member 68 assists in retaining the second end 48 of the elongated member 42 within the cavity 56 of the housing 50.

In some embodiments, the biasing member 68 may be a stainless steel material. In other embodiments, the biasing member 68 may be a carbon steel that may include a zinc and clear plating, a music wire that may include a zinc and yellow plating layer, and the like.

Figure 3:
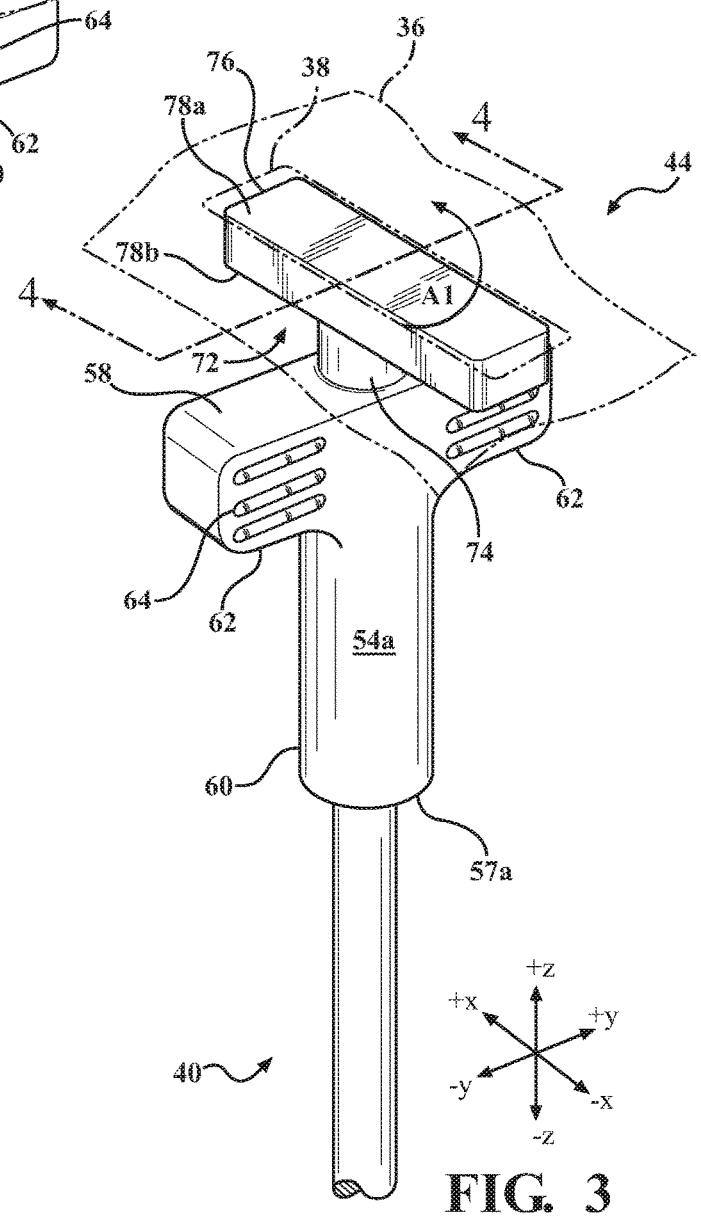
FIG. 3 schematically depicts an isolated view of the hood prop assembly of FIG. 1 in an unlocked position according to one or more embodiments shown or described herein.
Figure 4:
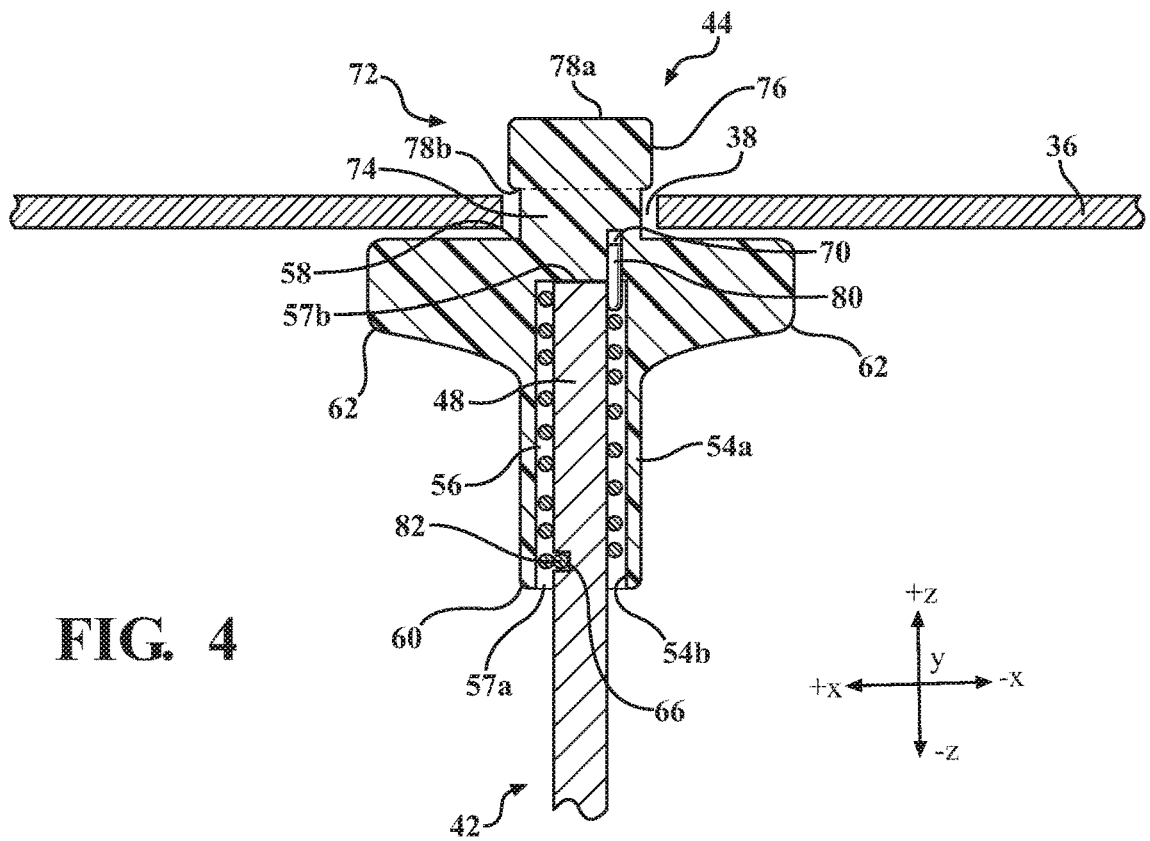
FIG. 4 schematically illustrates a cross section view of the hood prop assembly of FIG. 3 taken from line 4-4 according to one or more embodiments shown and described herein.

Still referring to FIGS. 1-5, the biasing member 68 rotatably biases the housing 50 and the retainer mechanism 52 in the direction A1, with respect to the second end 48 of the elongated member 42 between the locked position (FIGS. 2 and 5) to retain the hood 18 in the raised position and an unlocked position (FIGS. 3-4) to facilitate an entry or removal of the T-shaped portion 72 into/from the slot 38 or aperture. As such, the arm 76 of the T-shaped portion 72 of the retainer mechanism 52 is inserted into the slot 38 of inner panel 37 when the arm 76 of the T-shaped portion 72 is in the unlocked position (FIGS. 3 and 4). In the locked position (FIGS. 2 and 4), the arm 76 is rotated to lock into the slot 38 between the inner panel 37 and the hood 18 such that the arm 76 is perpendicular to the slot 38. In this configuration, the inner panel 37 is locked between the T-shaped portion 72 and the distal end 58 of the housing 50, which is also rotated, such that the inner panel 37 is locked onto the elongated member 42.

As such, it should be understood that, in some embodiments, the housing 50, including the T-shaped portion 72, rotate 90 degrees from the locked position to the unlocked positon in the direction A1 with respect to the second end 48 of the elongated member 42. That is, a rotational force that counteracts and overcomes the biasing member 68 is needed to cause the 90 degree rotation. In other embodiments, the housing 50, including the T-shaped portion 72, may rotate more or less than 90 degrees from the locked position to the unlocked positon in the direction A1 with respect to the second end 48 of the elongated member 42. Further, in other embodiments, the T-shaped portion 72 may rotate independent from the housing 50 and, as such, may rotate 90 degrees from the locked position to the unlocked positon in the direction A1 with respect to the distal end 58 of the housing 50.

Figure 5:
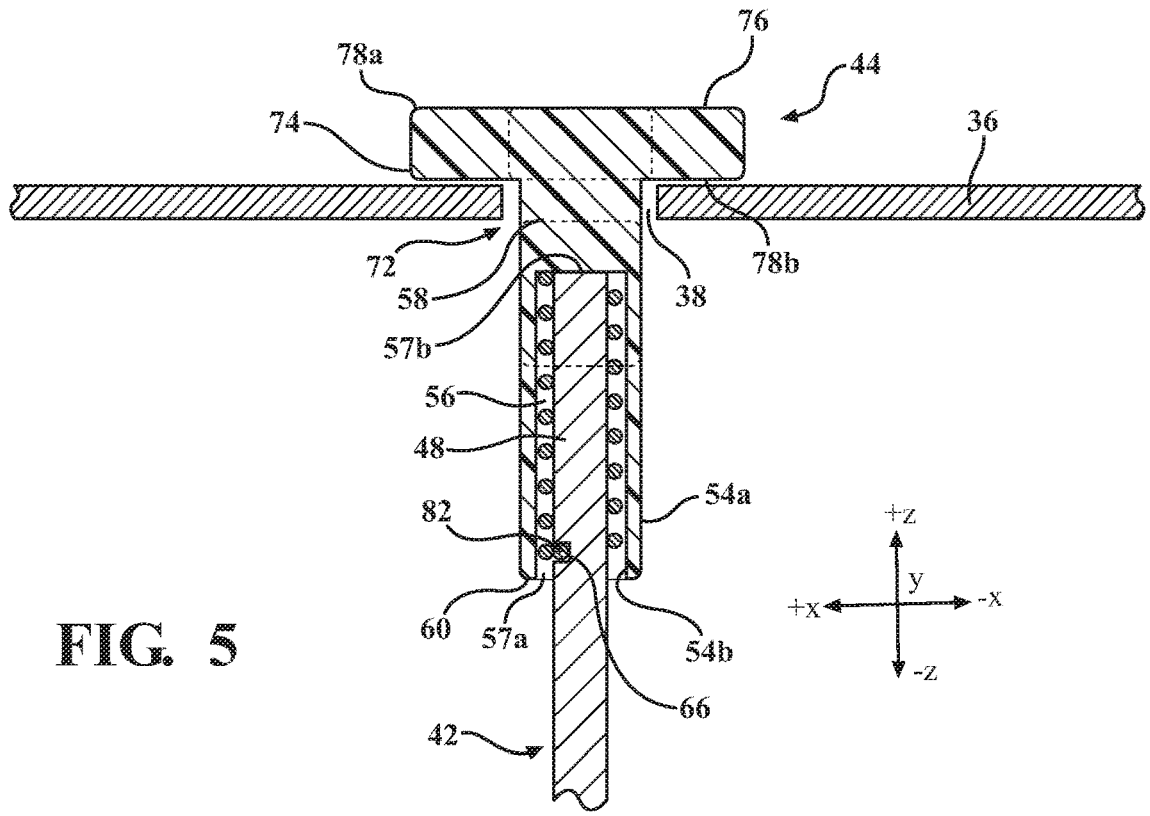
FIG. 5 schematically illustrates a cross section view of the hood prop assembly of FIG. 2 taken from line 5-5 according to one or more embodiments shown and described herein.

The biasing member 68 rotatably biases the T-shaped portion 72 towards the locked position, as illustrated in FIG. 5. Further, the pair of flanges 62 provide the contact surface 64 for the user to rotate the housing 50 and the T-shaped portion 72 from the locked position to the unlocked position, which in turn rotates the biasing member 68. It is appreciated that the biasing member 68 is in a twisted compressed state when the housing 50 and T-shaped portion 72 is in the unlocked position and in an untwisted or uncompressed state when the housing 50 and T-shaped portion 72 is in the locked position. That is, when a rotational force is applied to the pair of flanges 62, that counteracts and overcomes the biasing member 68, the biasing member 68 is rotated while the distal and proximate legs 80, 82 remain engaged within the receiving channel 70 and the notch 66, respectively, such that the biasing member 68 is twisted or compressed tighter. The twisting or compressing of the biasing member 68 tighter when a force is applied to the pair of flanges 62 to rotate the housing 50 and the T-shaped portion 72 in the direction A1 from the locked position to the unlocked position creates an internal force on the biasing member 68. The internal force biases the housing 50 and the T-shaped portion 72 towards the locked position. As such, when the force is removed from the pair of flanges 62, the biasing member 68 untwists or becomes uncompressed, and in which the biasing member rotatable biases the housing 50 and the T-shaped portion 72 into the locked position.

In embodiments, the housing 50 and the T-shaped portion 72 may move into a plurality of positions, or a plurality of intermediate positions, between the locked position and the unlocked position. It is appreciated that in some of the intermediate positions, the arm 76 may be positioned perpendicular to the slot 38 of the inner panel 37 and, in other intermediate positions, the arm 76 may be angled with respect to the slot 38 of the inner panel 37. In some embodiments, the plurality of intermediate positions may be determined by the size and/or shape of the slot 38, the size and shape of the arm 76 and the like. In other embodiments, the plurality of intermediate positions may be determined by the size and/or shape of the biasing member 68, the distal and proximate legs 80, 82, and the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hood prop assembly for a vehicle having a hood panel, the hood panel having a slot, the hood prop assembly comprising:
   an elongated member having a first end and a second end, the first end is coupled to the vehicle;
   a housing comprising:
      a distal end and a proximate end, and
      a cavity extending axially from the proximate end to receive the second end of the elongated member,
   a retainer mechanism extending from the distal end of the housing,
      wherein the housing and the retainer mechanism rotatably move with respect to the second end of the elongated member between a locked position and an unlocked position, and
      wherein in the locked position the retainer mechanism engages with the slot of the hood panel to retain the hood panel and in the unlocked position the retainer mechanism disengages with the slot of the hood panel.

2. The hood prop assembly of claim 1, wherein the elongated member snap fits into the cavity of the housing.

3. The hood prop assembly of claim 1, wherein the housing further comprises:
   a pair of flanges extending outwardly from the distal end of the housing,
   wherein each of the pair of flanges have a contact surface to receive a rotational force necessary to rotate the housing and the retainer mechanism between the locked position and the unlocked position.

4. The hood prop assembly of claim 3, wherein the contact surface of each of the pair of flanges is a friction surface.

5. The hood prop assembly of claim 1, wherein the retainer mechanism further includes a T-shaped portion and a biasing member, the biasing member biases the housing and the retainer mechanism towards the locked position.

6. The hood prop assembly of claim 5, wherein the T-shaped portion further comprises:
   a base extending from the distal end in a direction opposite of the proximate end of the housing;
   an arm coupled to the base,
   wherein the arm is inserted into the slot of the hood panel when the T-shaped portion is in the unlocked position and retains the hood panel between the arm and the distal end of the housing in the locked position.

7. The hood prop assembly of claim 5, wherein the biasing member is in a twisted compressed state when the T-shaped portion is in the unlocked position and in an untwisted state when the T-shaped portion is in the locked position.

8. The hood prop assembly of claim 5, wherein the biasing member is positioned within the cavity and between the distal and proximal ends of the housing.

9. The hood prop assembly of claim 8, wherein the biasing member circumferentially surrounds a portion of the elongated member when the elongated member is seated within the cavity.

10. The hood prop assembly of claim 5, wherein the biasing member includes a distal leg and a proximate leg.

11. The hood prop assembly of claim 10, wherein the elongated member includes a notch, a portion of the proximate leg of the biasing member is positioned within the notch.

12. The hood prop assembly of claim 10, wherein the cavity includes a receiving channel, a portion of the distal leg of the biasing member is positioned within the receiving channel.

* * * * *